United States Patent

Hattori et al.

[11] Patent Number: 5,904,883
[45] Date of Patent: May 18, 1999

[54] METHOD FOR PRODUCING OPTICAL FIBER RIBBON

[75] Inventors: Tomoyuki Hattori; Toshihisa Sato; Kohei Kobayashi; Kaoru Okuno; Ken Takahashi; Ryoei Oka; Masayuki Okubo, all of Yokohana, Japan

[73] Assignee: Sumitomo Electric Industries, Ltd., Osaka, Japan

[21] Appl. No.: 08/979,911

[22] Filed: Nov. 5, 1997

[30] Foreign Application Priority Data

Nov. 6, 1996 [JP] Japan .................................. 8-308625

[51] Int. Cl.⁶ .................................................. B29D 11/00
[52] U.S. Cl. ...................... 264/1.27; 264/1.28; 427/163.2
[58] Field of Search ................... 264/1.27, 1.28, 264/1.29; 427/163.2; 425/174.4

[56] References Cited

FOREIGN PATENT DOCUMENTS

| | | |
|---|---|---|
| 0 357 139 | 3/1990 | European Pat. Off. . |
| 0 438 668 | 7/1991 | European Pat. Off. . |
| 0 636 913 | 2/1995 | European Pat. Off. . |
| 38 39 669 | 5/1990 | Germany . |
| 63-161418 | 7/1988 | Japan . |
| 1-250911 | 10/1989 | Japan . |
| 4-049603 | 11/1992 | Japan . |

OTHER PUBLICATIONS

Patent Abstracts of Japan, vol. 012, No. 194 (P–713), Jun. 7, 1988 & JP 62 299912 A (Toray Ind Inc), Dec. 26, 1987.

*Primary Examiner*—Mathieu D. Vargot
*Attorney, Agent, or Firm*—Pillsbury Madison & Sutro LLP

[57] ABSTRACT

In a method for producing an optical fiber ribbon, a plurality of coated optical fibers is fed out so that the plurality of coated optical fibers are arranged in a plane in a concentrator. A ribbon matrix composed of ultraviolet-curing resin is applied onto the plurality of coated optical fibers in a coater. Ultraviolet rays is radiated to cure the ribbon matrix. The plurality of coated optical fibers are arranged at intervals in a plane in the concentrator.

9 Claims, 4 Drawing Sheets

$t_2$: ARRANGEMENT POSITION OF SECOND CORE $t_3$: ARRANGEMENT POSITION OF THIRD CORE

METHOD FOR PRODUCING OPTICAL FIBER RIBBON

BACKGROUND OF THE INVENTION

1. Field of the Invention

The present invention relates to improvement in a method for producing an optical fiber ribbon in which a plurality of coated optical fibers are arranged in a plane and integrated in the form of a ribbon

2. Description of the Related Art

Conventionally, as a method for producing an optical fiber ribbon, Unexamined Japanese Patent Publication (kokai) No. Hei-1-250911 discloses a method in which coated optical fibers are passed through a narrowing roller while they are being displaced in a direction perpendicular to the direction of the arrangement of the coated optical fibers to thereby suppress the force urging the coated optical fibers to separate from one another at the time of the narrowing of the coated optical fibers.

In this case, because the coated optical fibers are passed through the narrowing roller while they are being displaced in a direction perpendicular to the direction of the arrangement of the coated optical fibers, the work of adjusting the position of the narrowing roller both in the direction of the arrangement of the coated optical fibers and in a direction perpendicular to the direction of the arrangement of the coated optical fibers becomes very delicate if the optical fibers are to be arranged in a plane without any gap in a coater. Accordingly, the narrowing roller is disadvantageous in that adjustment is troublesome and workability is poor.

Further, Unexamined Japanese Patent Publication (kokai) No. Sho-63-161418 discloses a method in which coated optical fibers are configured in linearly vertical line and arranged by a plurality of rollers each having a U-shaped surface as its outer circumferential surface.

In this case, when the rollers each having the U-shaped surface rotate at a high speed, vibration occurs in rotation shafts because the rotation shafts have slight vibration caused by idling of ball bearings, or the like. At that time, the respective coated optical fibers move on the outer circumferential surfaces of the rollers toward the roller end portions, so that the respective coated optical fibers become disordered. Accordingly, the arrangement of the optical fiber ribbon thus obtained becomes poor.

Accordingly, in the case where a plurality of rollers each having a U-shaped surface in its outer circumference are used in high-speed production, there is a disadvantage that the respective coated optical fibers particularly located at ends are displaced laterally on the U-shaped surfaces to thereby make the arrangement poor.

Further, Examined Japanese Utility Model Publication No. Hei-4-49603 discloses a method in which coated optical fibers are arranged by two kinds of grooved rollers which are set in the directions of the width and thickness of the optical fiber ribbon respectively.

In this case, the groove dimensions of the rollers must be specified with sufficient allowance for any variation that may exist depending on the different production lots with respect to not only the outside diameter of the respective coated optical fibers but also the overall dimensions of the fiber ribbons. It is, therefore, difficult to obatin an exact arrangement of the coated optical fibers by means of such groove rollers.

Further, when a plurality of coated optical fibers are forced to be put into a narrow groove, the coated optical fibers are pressed strongly against the groove so that the coated optical fibers are injured.

SUMMARY OF THE INVENTION

It is an object of the present invention to provide a method for producing an optical fiber ribbon which is free from the disorder of optical fiber arrangement, the injury of the respective coated optical fibers, and the like.

As a result of various examinations, the present inventor has found that the disorder of the arrangement of coated optical fibers, the injury of coated optical fibers, etc. can be prevented when a plurality of coated optical fibers are passed through a concentrator constituted by a roller particularly having a plurality of grooves so that the plurality of coated optical fibers are arranged in a plane at intervals.

That is, the present invention provides:

(1) A method for producing an optical fiber ribbon, comprising the steps of: feeding out a plurality of coated optical fibers so that the plurality of coated optical fibers are arranged in a plane in a concentrator; applying ribbon matrix comprising ultraviolet-curing resin onto the plurality of coated optical fibers in a coater; and radiating ultraviolet rays from an ultraviolet-light irradiator to cure the ribbon matrix, wherein the plurality of coated optical fibers are arranged at intervals in a plane by the concentrator.

(2) In the method, the coated optical fibers are arranged preferably at intervals in the range of 0.25 to 10 mm.

(3) In the method, the plurality of coated optical fibers are preferably drawn into the coater at a concentration angle in the range of 0.05° to 2°.

(4) In the method, a level difference in the arrangement of the plurality of coated optical fibers is preferably in the range of 0 to 35 $\mu$m.

(5) In the method, destaticization is preferably performed for the plurality of coated optical fibers between the concentrator and the coater.

(6) In the method, the concentrator is constituted by a single roller with a plurality of grooves or a plurality of rollers each having a groove; and the single roller or each of the plurality of rollers is surface-treated with an electrically conductive material.

(7) In the method, the plurality of coated optical fibers between the concentrator and the coater are preferably free from contacting with any other materials.

DETAILED DESCRIPTION OF THE INVENTION

The present invention will be described below in detail with reference to the accompanying drawings.

Figure 1A:
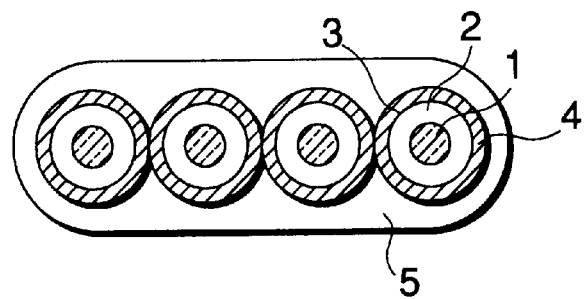
FIG. 1A is a sectional view of a four-fiber ribbon in which four coated optical fibers are arranged.
Figure 1B:
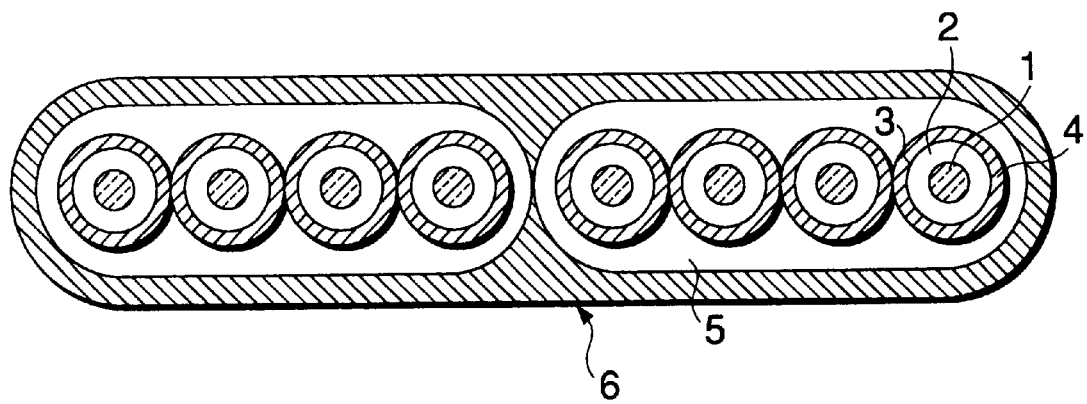
FIG. 1B is a sectional view of an eight-fiber ribbon in which eight coated optical fibers are arranged.

FIG. 1A is a sectional view of a four-fiber ribbon in which four coated optical fibers are arranged, and FIG. 1B is a sectional view of an eight-fiber ribbon in which eight coated optical fibers are arranged.

Here, the coated optical fiber means, for example, a 125 μm quartz glass core 1 coated with one protective coating material layer or coated with a plurality of protective coating material layers. In the case of the four-fiber ribbon as shown in FIG. 1A, each of four glass cores 1 is coated with an inner-layer protective coating material 2 and an outer-layer protective coating material 3, all of which are collectively coated with an inner-layer collective coating material 5. Each of the coated optical fibers may have a coloring resin material layer 4 as its outermost layer in which a pigment for identification is mixed as shown in FIG. 1A. In the case of the eight-fiber ribbon as shown in FIG. 1B, two four-fiber ribbon as shown in FIG. 1A are integrally coated with an outer-layer collective coating material 6.

In this case, the same or different ultraviolet-curing resin such as urethane acrylate, ester acrylate, epoxy acrylate, or the like, is preferably used as the protective coating material, collective coating material and coloring resin material.

Figure 2:
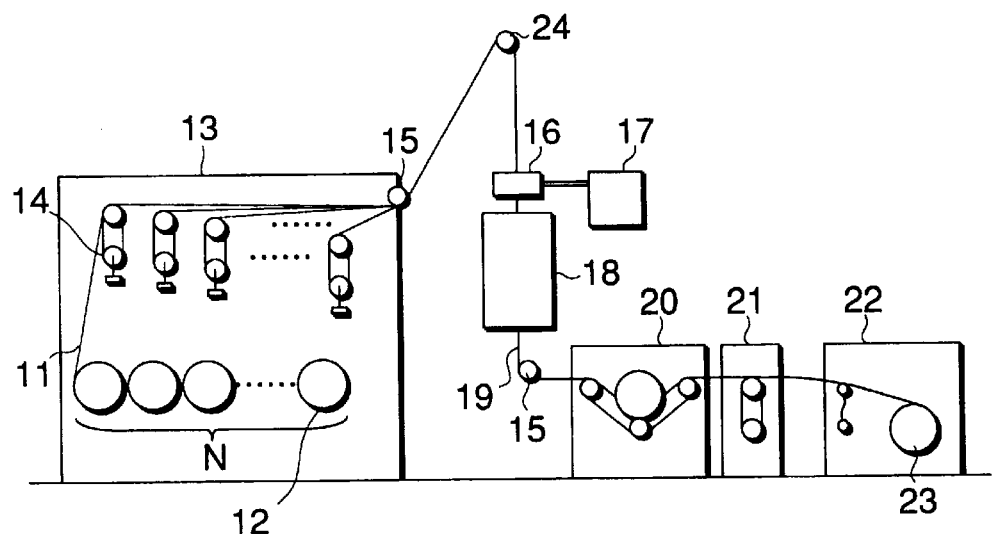
FIG. 2 is a schematic view of an apparatus for producing an optical fiber ribbon having one collective coating material layer.

FIG. 2 is a schematic view of an apparatus for producing an optical fiber ribbon having one collective coating material layer.

In the case of an optical fiber ribbon of N fibers, N-coated optical fibers 11 are fed out from a feed-out supply 13 having N reels 12 on which N coated optical fibers 11 are wound respectively. In this occasion, tensions of 30 to 200 grams are given to the coated optical fibers through dancer rollers 14 respectively.

The N coated optical fibers 11 thus fed out are sent to a concentrator 24 through guide rollers 15 with grooves respectively. Between the guide rollers 15 and the concentrator 24, it is necessary to adjust the coated optical fibers so as to be arranged at sufficient intervals.

Here, the arrangement of the coated optical fibers at sufficient intervals means that it is desirable to provide intervals in the range of 0.25 to 10 mm wide, preferably from 0.5 to 6 mm wide.

When the coated optical fibers are arranged at such intervals, the coated optical fibers are never brought into contact with one another by vibration. Accordingly, there is no fear of injury of optical fiber cores, and the like.

Next, after the coated optical fibers 11 are collected to some degree by the concentrator 24, the coated optical fibers 11 are arranged in one line so as to be close to one another in one direction (a direction perpendicular to the plane of the paper as shown in FIG. 2) between the concentrator 24 and the coater 16 and the arranged coated optical fibers 11 are fed to the coater 16.

A collective coating material composed of ultraviolet-curing resin such as urethane acrylate, ester acrylate, epoxy acrylate, or the like, is supplied from a pressure type resin reservoir tank 17 to the coater 16, so that the collective coating material is applied onto the N coated optical fibers 11.

Further, when the coated optical fibers 11 are passed through an ultraviolet-light irradiator 18, the collective coating material collectively applied is cured.

In such a manner, a cable having N coated optical fibers 11 integrated in the form of a ribbon, that is, an N-fiber ribbon 19 is wound on a predetermined reel 23 by a winder 22 after passing through a guide roller 15, a delivery capstan 20 and a take-up tension control dancer 21. The take-up tension is set to be in the range of 50 to 400 grams.

Concentration angles which are set in the present invention will be described below with reference to FIG. 4.

Figure 4:
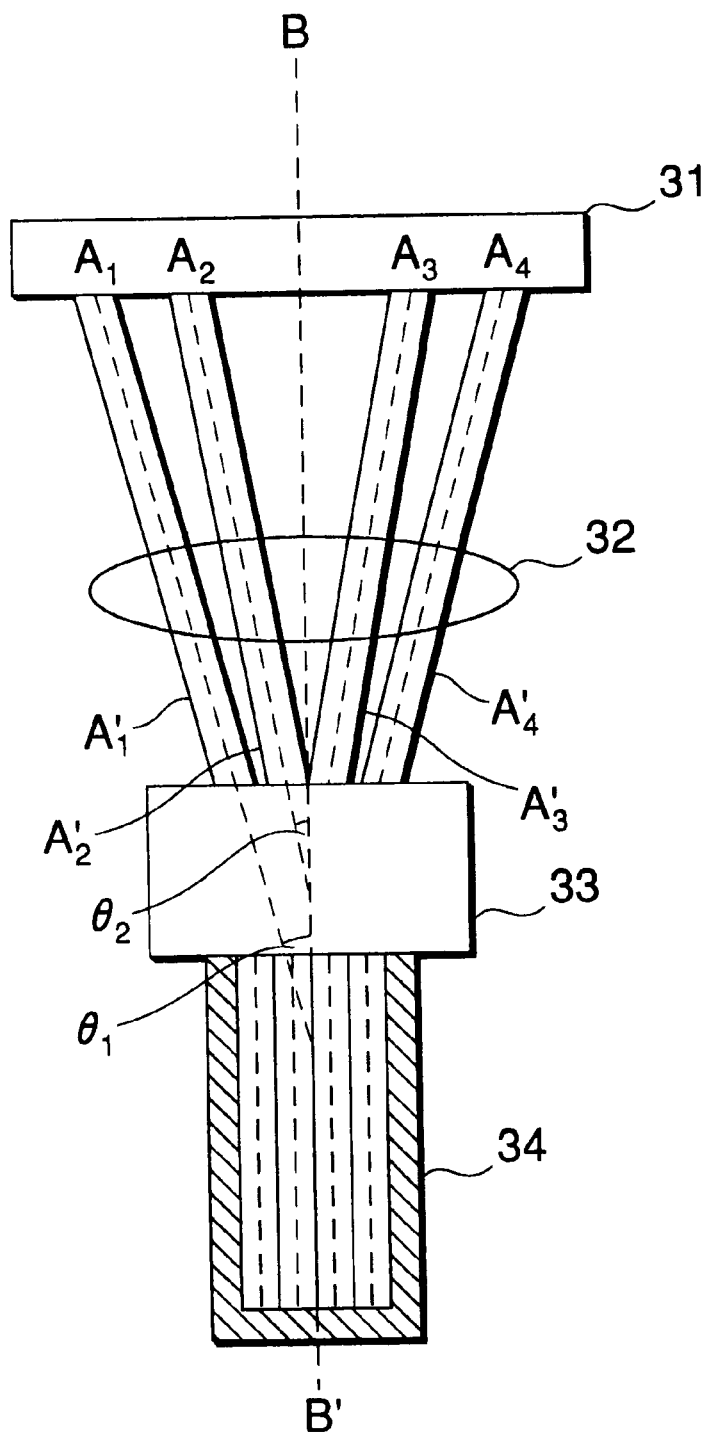
FIG. 4 is a state view for explaining the definition of the concentration angles at which coated optical fibers are concentrated between the concentrator and the coater.

FIG. 4 is a state view (seen in the direction facing the feed-out supply 13 from the winder 22) for explaining the definition of concentration angles at which coated optical fibers are concentrated between the concentrator and the coater.

In the fiber ribbon producing apparatus shown in FIG. 2, the lines passing through the respective longitudinal centers of the coated optical fibers 11 before the coater 16 are assumed now to be An-An'.

On the other hand, a line B-B' connecting the center B of the group of the coated optical fibers in the concentrator 24 and the center B' of the group of the coated optical fibers after the coater is taken. It is defined that the angles $\theta_1$, $\theta_2$ between the line An-An' and the line B-B' is concentration angles.

For example, in the case of a four-fiber ribbon, there are two concentration angles, that is, concentration angle $\theta_1$ formed between outside coated optical fibers and concentration angle $\theta_2$ formed between inside coated optical fibers.

In the present invention, it is necessary, from the point of view of preventing the disordered arrangement of coated optical fibers, that each of the concentration angles is in a specific range of 0.05 to 2°, preferably from 0.1 to 2°.

If the concentration angle is smaller than 0.05°, the optical fibers between the concentrator and the coater contact with one another so that there occur injury of optical fiber surfaces and strand vibration caused by static electricity by means of the contact. If the concentration angle is larger than 2°, force acts on the optical fibers so as to separate the optical fibers from one another in the coater. Accordingly, gaps are generated between the optical fibers so that the arrangement is disordered.

Figure 3:
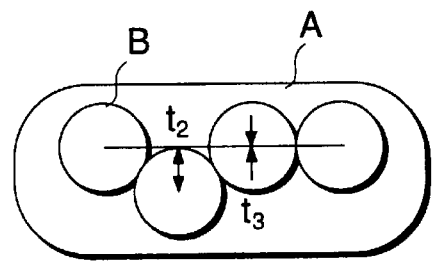
FIG. 3 is a sectional view of an optical fiber ribbon for explaining the definition of the arrangement level difference expressing the degree of arrangement of the respective coated optical fibers.

Further, the degree of arrangement of the coated optical fibers is evaluated on the basis of arrangement level differences as follows. That is, as the standard of the arrangement, the respective centers of the first and fourth fibers are connected to each other, and the values of deviations of the respective centers of the second and third fibers from the line connecting the respective centers of the first and fourth fibers are measured (hereinafter, the values of deviations being referred to as arrangement level differences) as shown in FIG. 3.

In this case, if the arrangement level difference is in the range of 0 to 35 μm, preferably from 0 to 25 μm, the transmission loss of the coated optical fibers can be prevented from being increased.

As described above, (1) because the plurality of coated optical fibers are preferably arranged in a plane at predetermined intervals by the concentrator so that the plurality of coated optical fibers are not brought into contact with one another, not only the optical fiber surfaces can be prevented from being injured but also the strand vibration caused by generation of static electricity can be prevented.

(2) Because the coated optical fibers are drawn into the coater at optimum concentration angles which are in a specific range, both the injury of optical fiber surfaces and the strand vibration caused by the generation of static electricity can be prevented so as to obtain good optical fiber arrangement.

(3) Even in the case where optical fibers simply run at a high speed in air, static electricity is caused by friction against the air so that strand vibration occurs. The following countermeasure is effective in suppressing accumulation of static electricity in the optical fibers.

A destaticizer (of the type for blowing air ionized by corona discharge from a far position to perform destaticization) may be provided between the concentrator and the coater so that the coated optical fibers fed thereto can be destaticized. Further, a solution of an antistatic agent such as a nonionic surface active agent, or the like, may be applied so that the coated optical fibers can be destaticized.

(4) Static electricity may be generated when the concentrator contacts with the optical fibers. When the concentrator constituted by a roller having a plurality of grooves is surface-treated with an electrically conductive material, for example, when an electrically conductive roller which is electrolessly plated with nickel is used, the accumulation of static electricity in the roller can be prevented.

(5) Because the coated optical fibers between the concentrator and the coater are arranged so as not to contact with any other materials, the injury of optical fiber surfaces can be prevented.

EXAMPLES

The present invention as to the case of a four-fiber ribbon will be described more specifically on the basis of the following examples. The scope of the present invention is not limited to those examples.

Production of Optical Fiber Ribbon

An optical fiber ribbon producing apparatus shown in FIG. 2 was used in Example 1.

A single-mode optical fiber bare-glass core having an outer diameter of 125 $\mu$m was coated with two layers of urethane acrylate ultraviolet-curing resin, and the two layers were further coated with a coloring resin layer of urethane acrylate ultraviolet-curing resin to thereby produce a coated optical fiber having an outer diameter of 250 $\mu$m.

Four of the coated optical fibers 11 thus produced were fed out from a feed-out supply 13 and urethane acrylate ultraviolet-curing resin was collectively applied onto the coated optical fibers 11 by a coater 16. The collective coating material 6 was then cured by radiation of ultraviolet rays in an ultraviolet-light irradiator 18 so as to integrate the coated optical fibers 11 with each other to thereby obtain a four-fiber ribbon cable 19. The take-up tension was selected to be 150 g.

Figure 5A:
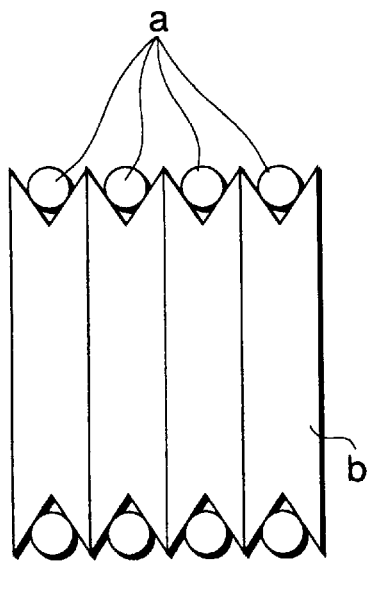
FIG. 5A is a sectional view showing the shape of a concentration roller having predetermined grooves according to Examples.
Figure 5B:
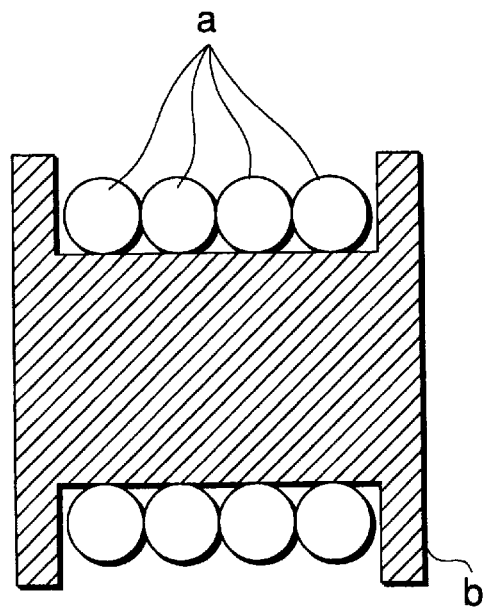
FIG. 5B is a sectional view showing the shape of a concentration roller having a U-shaped groove according to Comparative Examples.

FIGS. 5A and 5B shows the shapes of concentration rollers. FIG. 5A shows a roller having predetermined grooves according to the Examples, and FIG. 5B shows a concentration roller having a U-shaped groove according to Comparative Examples.

Example 1

An aluminum roller was used as the concentrator and urethane acrylate ultraviolet-curing resin was used as the collective coating material.

By changing the distance between the concentrator 25 and the coater 16 at the time of producing the optical fiber ribbon, the concentration angle formed between outside coated optical fibers was selected to be 0.3° and the concentration angle formed between the inside coated optical fibers was selected to be 0.1°. A roller having such a shape as shown in FIG. 5A was used as the concentrator.

FIG. 3 is a sectional view of an optical fiber ribbon for explaining the definition of the arrangement level difference expressing the degree of arrangement of the respective coated optical fibers.

As shown in FIG. 3, the respective centers of the first and fourth fibers were connected to each other to establish a standard of the arrangement, and the arrangement was evaluated by the value of deviation of each of the centers of the second and third fibers from the standard line connecting the respective centers of the first and fourth fibers. As a result, the respective arrangement level differences of the second and third fibers in the four-fiber ribbon produced in the above conditions were 5 $\mu$m and 7 $\mu$m. Thus, good arrangement was obtained.

Example 2

The same material as in Example 1 was used as the collective coating material and an electrically conductive roller electrolessly plated with nickel and having the shape shown in FIG. 5A was used as the concentrator. The concentration angle formed between the outside coated optical fibers was selected to be 1.6° and the concentration angle formed between the inside coated optical fibers was selected to be 0.7°.

Further, a destaticizer was provided between the concentrator and the coater so that the coated optical fibers fed to the destaticizer were destaticized. The destaticizer used herein was of the type blowing air ionized by corona discharge from a far position to perform destaticization.

In the four-fiber ribbon produced in the above conditions, the arrangement level differences of the respective centers of the second and the third fibers were 12 $\mu$m and 8 $\mu$m. Thus, good arrangement was obtained.

Comparative Example 1

A roller having a U-shaped groove as shown in FIG. 5B was used as the concentrator. The width of the U-shaped roller groove was selected to be 1.1 mm substantially equal to the total width of the four coated optical fibers. The coated optical fibers were concentrated by this roller so as to be close to one another.

As a result, the vibration of the respective optical fibers became intensive when the speed became high. In the optical fiber ribbon produced thus, the arrangement level differences of the respective centers of the second and third coated optical fibers were 52 $\mu$m and 37 $\mu$m. Thus, the obtained arrangement was poor and the transmission loss increased.

Comparative Example 2

A roller having grooves arranged at intervals was used as the concentrator. The distance between the concentrator and the coater was selected so that the concentration angle ($\theta_1$) of coated optical fibers located outside was 3°.

As a result, there was no optical vibration but the arrangement level differences of the respective centers of the second and third fibers in the optical fiber ribbon produced thus were 71 $\mu$m and 25 $\mu$m. Thus, the arrangement was poor and gaps were generated between the coated optical fibers.

As described above, according to the present invention, (A) because a plurality of coated optical fibers never contact with one another before the plurality of coated optical fibers reach the coater, not only the optical fiber surfaces can be prevented from being injured but also the static electricity due to friction between optical fibers can be prevented from being generated.

(B) Because the coated optical fibers are concentrated at optimum angles, the level difference can be decreased.

(C) Because the respective coated optical fibers enter into the concentrator at optimum arrangement level differences, the arrangement level difference can be decreased.

(D) Because the coated optical fibers running between the concentrator and the coater are destaticized by a destaticizer, or the like, the optical fiber vibration caused by static electricity can be suppressed.

(E) Because a roller having grooves is surface-treated with an electrically conductive material, static electricity to be accumulated in the coated optical fibers can be eliminated so that the optical fiber vibration due to static electricity can be suppressed.

(F) Because there is no contact substance between the concentrator and the coater, the injury of optical fiber surfaces can be prevented.

What is claimed is:

1. A method for producing an optical fiber ribbon, comprising the steps of:

feeding out from a supply of coated optical fibers a plurality of coated optical fibers so that they are arranged in a plane in a concentrator, said plurality of coated optical fibers are arranged at intervals in the plane by said concentrator;

drawing said plurality of coated optical fibers from said concentrator into a coater at an angle in the range of 0.05° to 2°;

applying a ribbon matrix comprising ultraviolet-curing resin onto said plurality of coated optical fibers in said coater; and radiating said ribbon matrix with ultraviolet rays from an ultraviolet-light irradiator to cure said ribbon matrix.

2. A method for producing an optical fiber ribbon according to claim 1, wherein said coated optical fibers are arranged at intervals in the range of 0.25 to 10 mm.

3. A method for producing an optical fiber ribbon according to claim 1, wherein a level difference in the arrangement of said plurality of coated optical fibers is in the range of 0 to 35 μm.

4. A method for producing an optical fiber ribbon according to claim 1, further comprising the step of: performing destaticization for said plurality of coated optical fibers between said concentrator and said coater.

5. A method for producing an optical fiber ribbon according to claim 1, wherein said concentrator is constituted by a single roller with a plurality of grooves or a plurality of rollers each having a groove; and said single roller or each of said plurality of rollers is surface-treated with an electrically conductive material.

6. A method for producing an optical fiber ribbon according to claim 1, wherein said plurality of coated optical fibers are only in contact with said concentrator and said coater when said plurality of coated optical fibers are located between said concentrator and said coater.

7. A method for producing an optical fiber ribbon according to claim 2, wherein said coated optical fibers are arranged at intervals in the range of 0.5 to 6 mm.

8. A method for producing an optical fiber ribbon according to claim 2, wherein said plurality of coated optical fibers are drawn into said coater at a concentration angle in the range of 0.1° to 2°.

9. A method for producing an optical fiber ribbon according to claim 3, wherein a level difference in the arrangement of said plurality of coated optical fibers is in the range of 0 to 25 μm.

* * * * *